United States Patent [19]
LaRosa et al.

[11] Patent Number: 5,367,538
[45] Date of Patent: Nov. 22, 1994

[54] APPARATUS AND METHOD FOR DIRECT PHASE DIGITIZING

[75] Inventors: Christopher P. LaRosa, Lake Zurich; Michael J. Carney, Palatine, both of Ill.

[73] Assignee: Motorola Inc., Schaumburg, Ill.

[21] Appl. No.: 124,995

[22] Filed: Sep. 21, 1993

Related U.S. Application Data

[63] Continuation of Ser. No. 806,515, Dec. 13, 1991, abandoned.

[51] Int. Cl.⁵ ............................................. H03D 3/18
[52] U.S. Cl. .................................... 375/82; 375/83; 329/306; 329/310; 329/346; 455/214
[58] Field of Search .................... 375/53–54, 375/56, 80, 82–84, 86; 331/179; 329/304, 306, 310, 346; 455/205, 214

[56] References Cited

U.S. PATENT DOCUMENTS

| | | | |
|---|---|---|---|
| 3,571,712 | 3/1971 | Hellworth | 329/306 |
| 3,997,847 | 12/1976 | Tong | 375/84 |
| 4,190,802 | 2/1980 | Levine | 329/306 |
| 4,561,098 | 12/1985 | van Tol | 375/82 |
| 4,584,693 | 4/1986 | Levy et al. | 329/310 |
| 5,084,669 | 1/1992 | Dent | 324/83 D |
| 5,117,195 | 5/1992 | Robbins | 375/83 |
| 5,121,070 | 6/1992 | Tomita | 329/310 |
| 5,122,758 | 6/1992 | Tomita | 375/82 |
| 5,260,975 | 11/1993 | Saito | 375/83 |

OTHER PUBLICATIONS

*All Digital Adaptive Carrier Tracking Coherent Demodulator*, Shigeki Saito, Harui Yamamoto, Yasushi Yamao. NTT Tadio Communication System Laboratories, Feb., 1991, Section 4.1 FIGS. 3 and 4.

Primary Examiner—Stephen Chin
Assistant Examiner—Young Tse
Attorney, Agent, or Firm—Kirk W. Dailey

[57] ABSTRACT

This patent application discusses a direct phase digitizing apparatus (303) for use in a radiotelephone (101). The direct phase digitizing apparatus (303) accepts a first analog signal (309) having a phase, a voltage range and a first frequency. First, the direct phase digitizer generates an estimated phase map (611) having a second frequency and N-bits of resolution. Second, the direct phase digitizer detects a predetermined-voltage crossing (409) of the first analog signal (309). Third, using the predetermined-voltage crossings, the direct phase digitizer samples the estimated phase map. Fourth, a digital phase signal (623) is generated using the samples of the estimated phase map.

13 Claims, 3 Drawing Sheets

APPARATUS AND METHOD FOR DIRECT PHASE DIGITIZING

This is a continuation of application Ser. No. 07/806,515, filed Dec. 13, 1991 and now abandoned.

FIELD OF THE INVENTION

This invention generally relates to radio receivers and more specifically to an apparatus for digitizing the phase of a limited radio frequency signal.

BACKGROUND OF THE INVENTION

Within a radio receiver, a phase detector is used to recover the phase information from the received signal. In a system utilizing a digital phase modulation scheme, a symbol slicer determines the symbol that is represented by the recovered phase information. Two methods of detecting the phase of a received signal are baseband I and Q processing and the direct phase quantization of a limited intermediate frequency (IF) signal.

One implementation of a phase detector operates in an I and Q digital system. In this system, the IF signal from the radio receiver is input into an I/Q translator which recovers the inphase (I) portion and the quadrature (Q) portion of the signal. The I and the Q signals are input into a pair of analog-to-digital converters (ADCs). The outputs of the ADCs are used to perform a tangent inverse of Q over I to produce a digitized phase signal. This system uses several individual components. Two high current ADCs, a ROM look-up table and a digital signal processor (DSP) are necessary to implement this system.

A second type of phase detector, which directly quantizes the phase of a limited IF waveform, is a completely digital implementation. Here, the modulated IF input signal is limited to a predetermined voltage range. This limited input signal is then compared to $2^{N-1}$ phase shifted reference signals at the intermediate frequency. The regenerated reference signal having a phase that most closely resembles the limited input signal is chosen. The selected reference signal is used by the phase processing circuitry to produce an N-bit digital word representing the phase of the IF input signal. Because this implementation requires the generation of $2^{N-1}$ reference signals, it is relatively complex.

In order to allow radio receivers to be implemented in smaller, simpler devices such as portable radiotelephones, there is a need for a low cost digital phase detector having a small size and low power consumption.

SUMMARY OF THE INVENTION

The present invention encompasses a direct phase digitizing apparatus for use in a radio receiver. The direct phase digitizing apparatus accepts a first analog signal having a phase, a voltage range and a first frequency. First, the direct phase digitizer generates an estimated phase map having a second frequency and N-bits of resolution. Second, the direct phase digitizer detects a predetermined voltage crossing of the first analog signal. Third, using the voltage crossings, the direct phase digitizer samples the estimated phase map. Fourth, a digital phase signal is generated using the samples of the estimated phase map.

DESCRIPTION OF A PREFERRED EMBODIMENT

The preferred embodiment encompasses a direct phase digitizer for use in a radiotelephone receiver. A direct phase digitizer allows the receiver to extract a word representing the phase of a received signal without the use of an ADC. The direct phase digitizer includes a modulo $2\pi$ phase ramp generator, a zero-voltage crossing detector and a reference oscillator. The modulo $2\pi$ phase ramp function steps through the possible phases of the received signal at a predetermined frequency generated by the reference oscillator. The phase ramp function is sampled whenever a zero-voltage crossing is detected on the input signal. These samples are stored in D flip-flops; the outputs of the D flip-flops form the digital phase word used by the phase processing circuitry.

Figure 1:
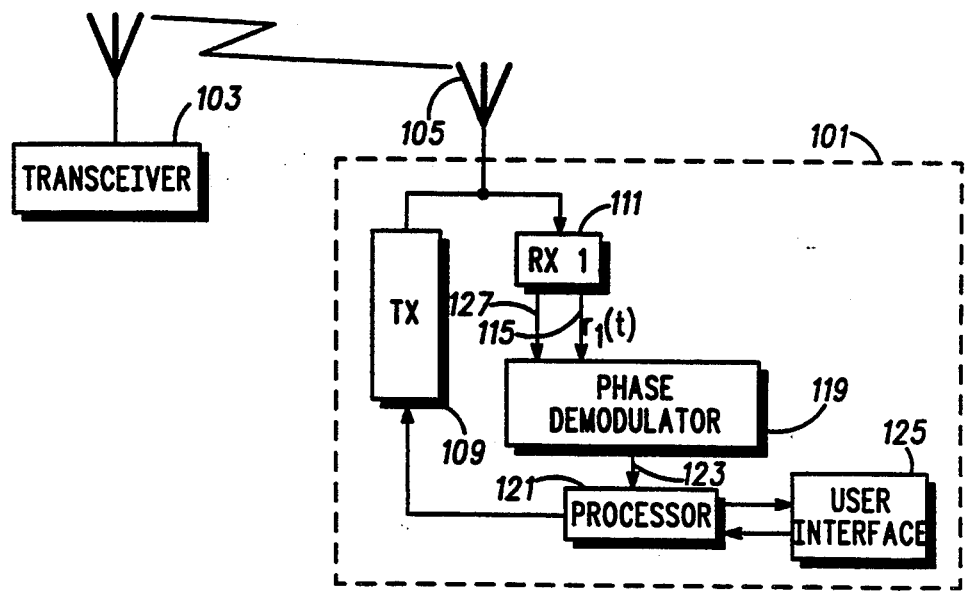
FIG. 1 is a block diagram of a radiotelephone system which may employ the present invention.

FIG. 1 is a block diagram of a radiotelephone system which may employ the present invention. In the radiotelephone system, the fixed site transceiver 103 sends and receives radio frequency (RF) signals to and from mobile and portable radiotelephones contained within a fixed geographic area served by the fixed site transceiver 103. The radiotelephone 101 is one such radiotelephone served by the fixed site transceiver 103.

While receiving signals from the fixed site transceiver 103, the radiotelephone 101 uses the antenna 105 to couple the RF signal and convert the RF signal into an electrical RF signal. The electrical RF signal is received by the radio receiver 111, for use within the radiotelephone 101. The receiver 111 generates the intermediate frequency (IF) signal 115. This signal is input into the phase demodulator 119. The phase demodulator 119 outputs a symbol signal 123 for use by the processor 121. Processor 121 formats the symbol signal 123 into voice or data for the user interface 125. The user interface 125 contains a microphone, a speaker and a keypad.

Upon the transmission of RF signals from the portable radiotelephone 101 to the fixed site transceiver 103, the processor 121 formats the voice and/or data signals from the user interface. The formatted signals are input into the transmitter 109. The transmitter 109 converts the data into electrical RF signals. The electrical RF signals are converted into RF signals and output by antenna 105. The RF signals are received by the fixed site transceiver 103.

Figure 2:
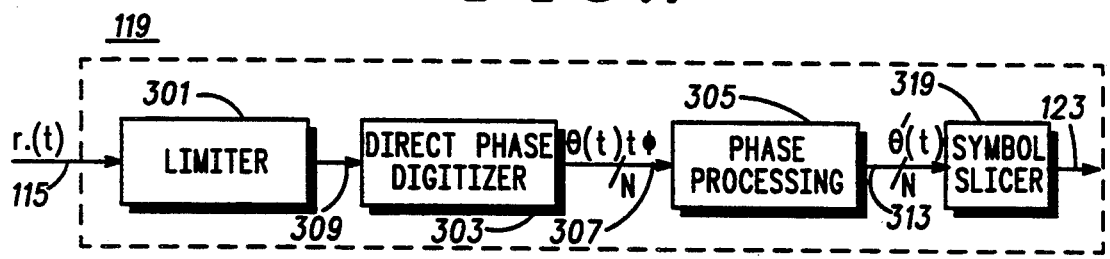
FIG. 2 is a block diagram of a phase demodulator in accordance with the present invention.

FIG. 2 is a block diagram of the phase demodulator 119 as illustrated in FIG. 1. The phase demodulator 119 includes the limiter 301, the direct phase digitizer 303, the phase processing circuit 305 and the symbol slicer 319. The limiter 301 receives the IF signal 115 and limits the voltage of the IF signal 115 to two voltage levels corresponding to a logic level 0 and a logic level 1. The limiter 301 outputs a limited receive signal 309. The direct phase digitizer 303 uses both the negative and positive zero-crossings of the limited received signal 309 to sample the modulo $2\pi$ phase ramp function. The samples are used to generate the digitized phase signal 307 ($\theta(t)+\phi$). $\theta(t)$ is the desired digitized phase signal and $\phi$ is a constant phase offset. The digitized phase signal 307 is input into the phase processing unit 305. The phase processing unit 305 removes the constant phase offset ($\phi$). The phase processing unit 305 may contain either a coherent phase processor or a differentially coherent phase processor. In the preferred embodiment, a differentially coherent phase processor is used to remove the constant phase offset ($\phi$). The resulting digital phase signal ($\theta'(t)$) 313 is input to the symbol slicer 319. The symbol slicer 319 outputs the symbol decisions 123 which correspond to the detected phase signal 313.

Figure 3:
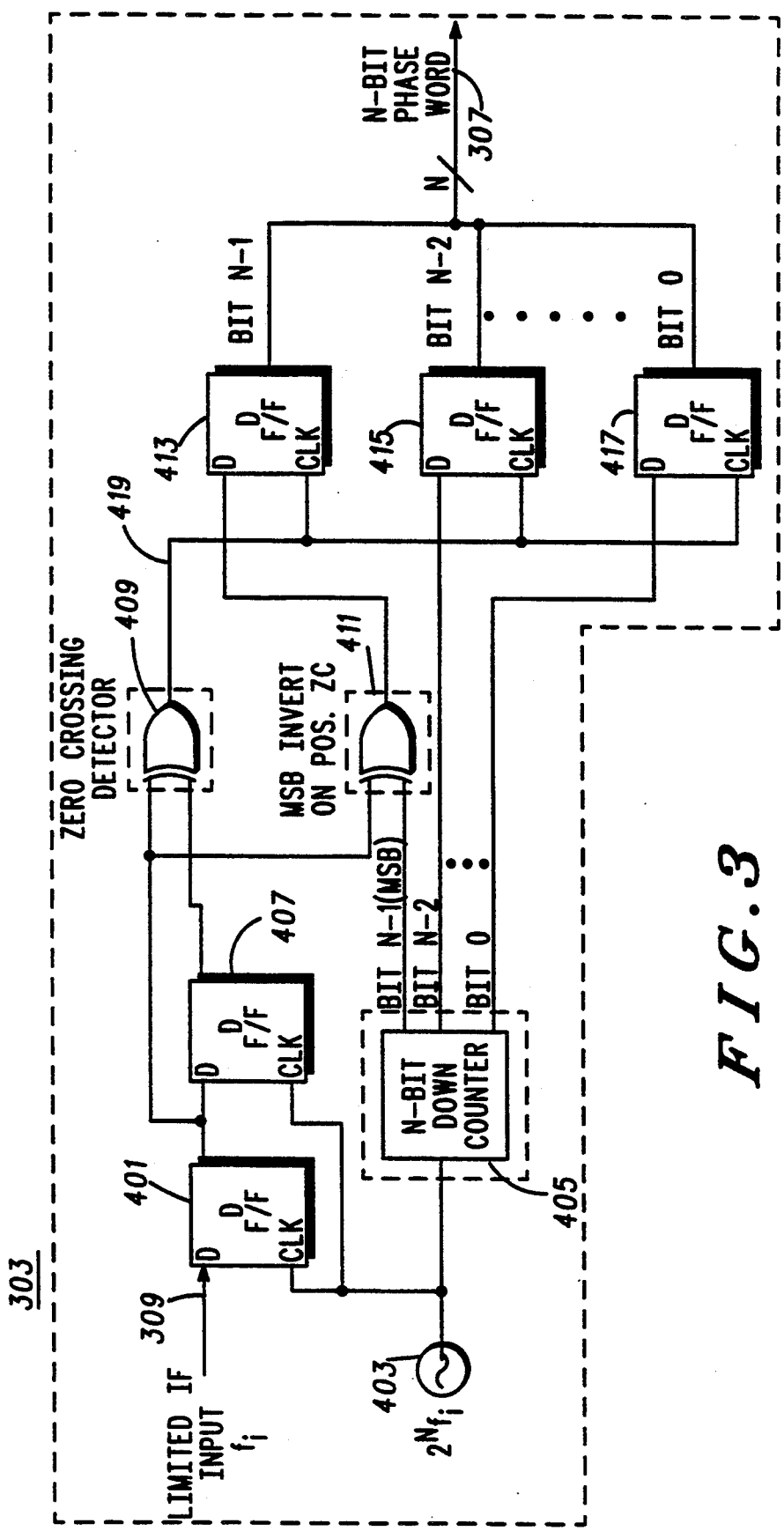
FIG. 3 is a block diagram of a direct phase digitizer in accordance with the present invention.

FIG. 3 is a detailed block diagram of the direct phase digitizer 303 illustrated in FIG. 2. The received limited IF input signal 309, in the preferred embodiment, has a frequency ($f_i$) equal to 456 kHz. The direct phase digitizer generates a 5 bit phase word 307. The reference oscillator 403 generates a frequency equal to $2^N f_i$, where N is the number of bits desired in the phase word. In the preferred embodiment N is equal to 5. Thus, the reference oscillator 403 has a frequency equal to (456 kHz)$2^5$=14.592 MHz.

Figure 4:
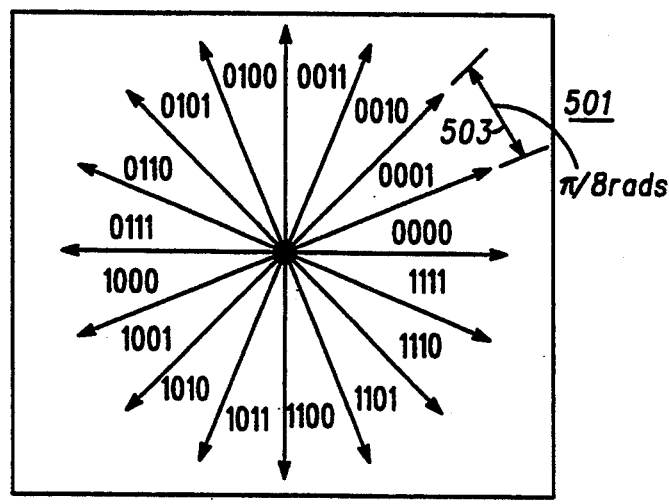
FIG. 4 is a four bit phase sector mapping in accordance with the present invention.

The reference oscillator 403 drives the clock inputs of the D flip-flops 401,407 and decrements the N-bit down counter 405. The output of the N-bit down counter 405 is an N-bit word which represents a modulo $2\pi$ phase as illustrated in FIG. 4. The counter 405 starts at a value of zero and at each clock of the reference oscillator 403, the counter 405 is decremented by 1. In equally sufficient embodiments, the N-bit down counter 405 could be replaced by an up-counter or the like, by someone of average skill in the art. The replacement would require some minor modifications to the subsequent phase processing circuitry.

Referring to FIG. 4, the counter moves clockwise through the phase sector map starting at zero. Note that FIG. 4 is a four bit phase sector mapping. In the preferred embodiment, a five bit sector mapping is used which would give twice as many phase sectors. The four bit phase sector map is used as an example for simplicity of illustration. The four bit phase map gives $\Pi/8$ resolution 503. In the preferred embodiment, the 5-bit phase map gives $\Pi/16$ resolution. Thus, improved resolution is obtained by increasing the number of bits (N) in the down counter 405. The number of bits (N) may be adjusted according to the needs of the application.

The two flip-flops 401,407 and the exclusive OR gate 409, generate a pulse 4 19 at each zero crossing of the limited IF input signal. The pulse 419 is used to latch the output of the phase sector counter 405 at each zero-crossing of the limited IF input signal 309. The D flip-flops 413, 415, 417 are used to store the N-bit phase word until a subsequent zero-crossing is detected. The exclusive OR gate 411 is used to invert the most significant bit of the N-bit phase word whenever a positive zero-crossing is detected on the limited input signal 309. The inverting effectively shifts the phase word output from the down counter by 180 degrees.

The output of the D-flip-flops 413, 415, 417 results in an N-bit bit phase signal 307. The N-bit phase signal 307 accurately represents the phase of the limited received input signal 309. The N-bit phase signal 307 has been created without digitizing the IF input signal 115. This eliminates the relatively expensive, power consuming, ADC required in other embodiments discussed in the background. Furthermore, this implementation is computationally simple and can be implemented in either a digital signal processor (DSP) or digital logic hardware by one of average skill in the art.

Both the positive and negative zero-crossings do not need to be detected in order to recreate an accurate digital phase. If only the positive zero-crossings are tracked, then the receiver's intermediate frequency and the frequency generated by the reference oscillator 403 would need to be doubled to obtain equal performance. Additionally, the inverting exclusive OR gate 411 could be eliminated.

Figure 5:
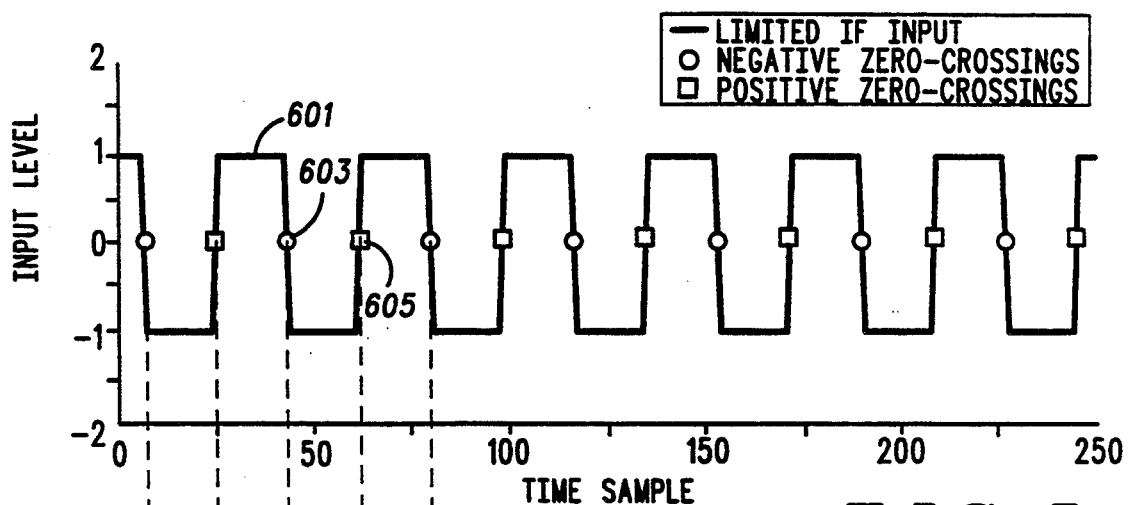
FIG. 5 is a graph of a limited IF input signal.
Figure 6:
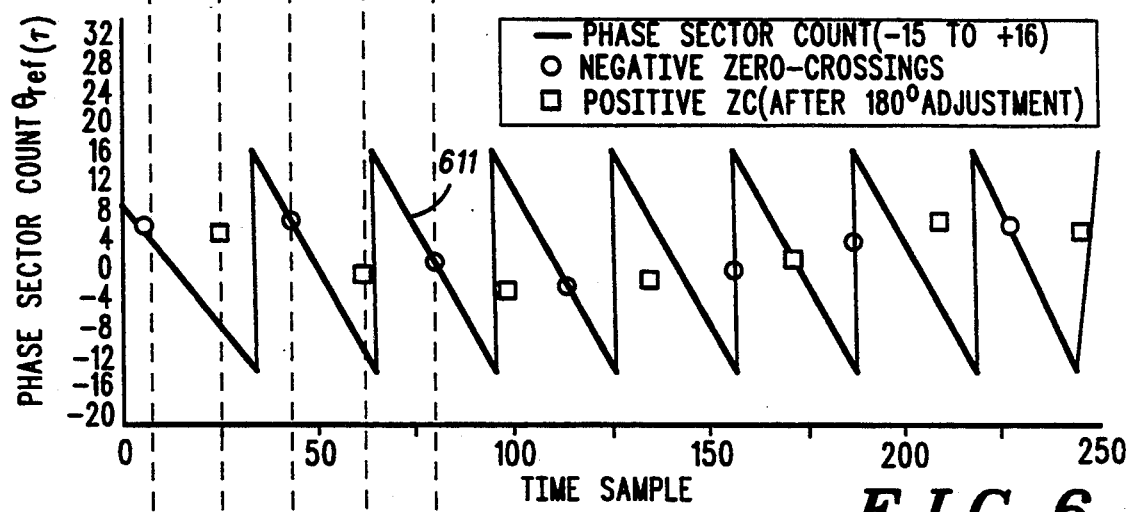
FIG. 6 is a phase sector count output including the zero crossing markings.
Figure 7:
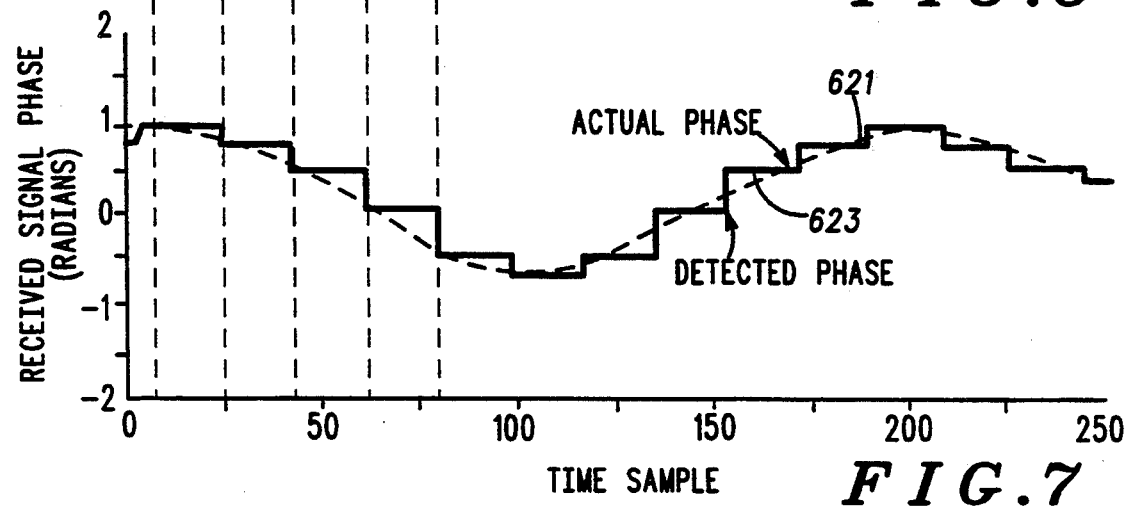
FIG. 7 is a reconstruction of a direct phase digitization in accordance with the present invention.

FIGS. 5, 6 and 7 are illustrations of the signals in the direct phase digitizer 303. FIG. 5 is an illustration of a typical limited IF input signal 309 (601). The negative zero-crossings are illustrated as the circular markings 603. The positive zero-crossings are illustrated by square markings 605. FIG. 6 contains the output signal 611 of the phase sector counter 405. The output signal 611 of the phase sector counter 405 is sampled at each zero-crossing of the limited IF input signal 309 (601). The positive zero-crossings are shifted by 180 degrees. The samples of the phase sector counter 405 are held in the N D-flip-flops 413, 415, 417. The output signal 307 (623) of the N D-flip-flops is illustrated in FIG. 7. The actual phase signal 621 overlays that of the output signal 623 for comparison purposes. In the preferred embodiment, the digital phase signal 623 is sufficiently accurate for the application. If more or less accuracy is desired, then the number of bits (N) in the phase word and the frequency of the reference oscillator may be adjusted.

Described herein is an easily implemented direct phase digitizer with low power consumption for use in a radio telephone system. Digitizing the phase using the simple logic described herein eliminates the need to digitize the entire IF signal. Hence, the expensive, power consuming ADCs are eliminated from the circuitry.

What is claimed is:

1. A direct phase digitizing apparatus for use in a radio receiver and accepting a first analog signal having a phase and a first predetermined frequency, the direct phase digitizer comprising:

a reference oscillator for generating a reference oscillator signal having a second predetermined frequency;

a counting device for generating an estimated phase map having a predetermined resolution and dependent upon said second predetermined frequency;

a detector for detecting a predetermined-voltage crossing of the first analog signal, wherein detecting said predetermined-voltage crossing are limited to detecting positive predetermined-voltage crossings;

a storage device, responsive only to each occurrence of said detecting, for storing said estimated phase map and generating a digital phase signal from said stored estimated phase map.

2. A direct phase digitizing apparatus for use in a radio receiver and accepting a first analog signal having a phase and a first predetermined frequency, the direct phase digitizer comprising:

means for generating a reference oscillator signal having a second predetermined frequency;

means for generating an estimated phase map having a predetermined resolution and dependent upon said second predetermined frequency;

means for detecting a predetermined-voltage crossing of the first analog signal, wherein said means for detecting said predetermined-voltage crossing are limited to negative predetermined-voltage crossings;

means, responsive only to each occurrence of said means for detecting, for storing said estimated phase map and generating a digital phase signal from said stored estimated phase map.

3. A direct phase digitizing apparatus for use in a radio receiver and accepting a first analog signal having a phase and a first predetermined frequency, the direct phase digitizer comprising:

means for generating a reference oscillator signal having a second predetermined frequency;

means for generating an estimated phase map having a predetermined resolution and dependent upon said second predetermined frequency;

means for detecting a predetermined-voltage crossing of the first analog signal, wherein said means for detecting said predetermined-voltage crossing are limited to positive and negative predetermined-voltage crossing;

means, responsive only to each occurrence of said means for detecting, for storing said estimated phase map and generating a digital phase signal from said stored estimated phase map.

4. A direct phase digitizing apparatus in accordance with claim 3 wherein said means for generating said digital phase signal further comprises means, responsive to detecting said positive predetermined-voltage crossings, for shifting said stored estimated phase map by 180 degrees.

5. A direct phase digitizing apparatus in accordance with claim 3 wherein said means for generating said digital phase signal further comprises means, responsive to detecting said negative predetermined-voltage crossings, for shifting said stored estimated phase map by 180 degrees.

6. A phase demodulating apparatus for use in a radio receiver, the radio receiver receiving a radio frequency (RF) signal and converting the RF signal to an intermediate frequency (IF) signal, the phase demodulating apparatus accepting the IF signal having a phase and a first predetermined frequency, the phase demodulating apparatus comprising:

means for generating a second predetermined frequency related to the first predetermined frequency by an exponential multiplication factor;

means for generating an estimated phase map having a predetermined resolution and dependent upon said second predetermined frequency;

means for detecting a predetermined-voltage crossing of said IF signal wherein said means for detecting said predetermined-voltage crossing includes positive and negative predetermined-voltage crossings;

means, responsive only to said means for detecting, for storing said estimated phase map and generating a first digital phase signal therefrom; and means for diminishing any undesired phase constant from said first digital phase signal, creating a second digital phase signal.

7. A phase demodulating apparatus in accordance with claim 6 wherein said means for generating said first digital phase signal further comprises means, responsive to detecting said positive predetermined-voltage crossings, for shifting said stored estimated phase map by 180 degrees.

8. A method of directly digitizing the phase of an analog input signal having a first predetermined frequency and a phase, the method comprising the steps of:

generating a reference oscillator signal having a second predetermined frequency;

generating an estimated phase map having a predetermined resolution and dependent upon said second predetermined frequency;

detecting a predetermined-voltage level crossing of the analog signal, said predetermined-voltage level crossing is limited to positive predetermined-voltage level crossings;

storing said estimated phase map in response only to said step of detecting the predetermined-voltage level crossing of the analog signal; and generating a digital phase signal from said stored estimated phase map representing the first phase of the analog signal.

9. A method of directly digitizing the phase of an analog input signal having a first predetermined frequency and a phase, the method comprising the steps of:

generating a reference oscillator signal having a second predetermined frequency;

generating an estimated phase map having a predetermined resolution and dependent upon said second predetermined frequency;

detecting a predetermined-voltage level crossing of the analog signal, said predetermined-voltage level crossing is limited to negative predetermined-voltage level crossings;

storing said estimated phase map in response only to said step of detecting the predetermined-voltage level crossing of the analog signal; and generating a digital phase signal from said stored estimated phase map representing the first phase of the analog signal.

10. A method of directly digitizing the phase of an analog input signal having a first predetermined frequency and a phase, the method comprising the steps of:

generating a reference oscillator signal having a second predetermined frequency;

generating an estimated phase map having a predetermined resolution and dependent upon said second predetermined frequency;

detecting a predetermined-voltage level crossing of the analog signal, said predetermined-voltage level crossing is limited to positive and negative predetermined-voltage level crossings;

storing said estimated phase map in response only to said step of detecting the predetermined-voltage level crossing of the analog signal; and generating a digital phase signal from said stored estimated phase map representing the first phase of the analog signal.

11. A method of directly digitizing the first phase of the analog input signal in accordance with claim 10 wherein said step of generating said digital phase signal further comprises the step of shifting said stored estimated phase map by 180 degrees responsive to the step of detecting the positive predetermined-voltage crossings.

12. A method of directly digitizing the first phase of the analog input signal in accordance with claim 10 wherein the step of generating said digital phase signal further comprises shifting said stored estimated phase map by 180 degrees responsive to the step of detecting the negative predetermined-voltage crossings.

13. A direct phase digitizing apparatus for use in a radio receiver and accepting a first analog signal having a phase and a first predetermined frequency, the direct phase digitizing apparatus comprising:

first means for generating a reference oscillator signal having a second predetermined frequency;

second means for generating an estimated phase map having a predetermined resolution and dependent upon said second predetermined frequency;

means for detecting positive and negative predetermined-voltage level crossings of the first analog signal;

means, responsive to said means for detecting, for storing said estimated phase map and for generating a digital phase signal therefrom.

* * * * *